(12) United States Patent
Dasar et al.

(10) Patent No.: US 10,530,658 B2
(45) Date of Patent: Jan. 7, 2020

(54) DISCOVERY OF SYSTEM WITH UNIQUE PASSWORDS BY MANAGEMENT CONSOLE

(71) Applicant: DELL PRODUCTS, L.P., Round Rock, TX (US)

(72) Inventors: Sundar Dasar, Round Rock, TX (US); Rakesh K. Ayolasomyajula, Georgetown, TX (US); Cyril Jose, Austin, TX (US); Swapnil Keshavrao Patil, Austin, TX (US); Pushkala Iyer, Round Rock, TX (US); Swathi Prasad Neti, Austin, TX (US); Anoop Kumar Alladi, Georgetown, TX (US)

(73) Assignee: Dell Products, L.P., Round Rock, TX (US)

( * ) Notice: Subject to any disclaimer, the term of this patent is extended or adjusted under 35 U.S.C. 154(b) by 322 days.

(21) Appl. No.: 15/594,555

(22) Filed: May 12, 2017

(65) Prior Publication Data

US 2018/0331913 A1 Nov. 15, 2018

(51) Int. Cl.
*H04L 29/06* (2006.01)
*H04L 12/24* (2006.01)

(52) U.S. Cl.
CPC .................... *H04L 41/12* (2013.01)

(58) Field of Classification Search
None
See application file for complete search history.

(56) References Cited

U.S. PATENT DOCUMENTS

| 7,185,204 | B2* | 2/2007 | Narayanaswami ..... H04L 63/08 713/155 |
| 8,037,530 | B1* | 10/2011 | Fink ...................... H04L 9/0841 713/153 |
| 8,244,875 | B2* | 8/2012 | Dispensa .......... H04L 29/12009 709/223 |

(Continued)

OTHER PUBLICATIONS

Hong, Daniel W.K. et al. Distributed Networking System for Internet Access Service. IEEE/IFIP Network Operations and Management Symposium. https://ieeexplore.ieee.org/stamp/stamp.jsp?tp=&arnumber=1015626 (Year: 2002).*

(Continued)

*Primary Examiner* — Jeremiah L Avery
(74) *Attorney, Agent, or Firm* — Isidore PLLC

(57) ABSTRACT

An information handling system (IHS) includes controller that performs a method of automating acquisition of link local Internet Protocol (IP) network address of servers. Controller acts as Group manager server (GMS) that maintains an inventory of a respective link local Internet Protocol (IP) network address and public key of each server that is addressable over a local area network (LAN). GMS receives an IP network address and credentials associated with a management console that are used to obtain a public key from the management console. GMS transmits to the management console a GMS IP network address and public key associated with the GMS. GMS encrypts the inventory with the public key of the management console to generate an encrypted inventory. GMS transmits the IP network address and the public key of the management console to each (Continued)

server. GMS forwards the encrypted inventory to the management console to enable secure communication.

19 Claims, 10 Drawing Sheets

(56) References Cited

U.S. PATENT DOCUMENTS

| | | | |
|---|---|---|---|
| 9,043,492 B2 | 5/2015 | A. R. et al. | |
| 9,825,822 B1* | 11/2017 | Holland | H04L 41/50 |
| 2002/0035681 A1* | 3/2002 | Maturana | H04L 63/0428 |
| | | | 713/151 |
| 2003/0014624 A1* | 1/2003 | Maturana | H04L 29/06 |
| | | | 713/151 |
| 2003/0051146 A1* | 3/2003 | Ebina | H04L 63/0428 |
| | | | 713/185 |
| 2005/0041675 A1* | 2/2005 | Trostle | H04L 29/12009 |
| | | | 370/401 |
| 2009/0210456 A1 | 8/2009 | Subramaniam | |
| 2010/0319060 A1 | 12/2010 | Aiken et al. | |
| 2011/0035585 A1* | 2/2011 | Haddad | H04L 63/0414 |
| | | | 713/162 |
| 2011/0119484 A1* | 5/2011 | Jallad | H04L 63/123 |
| | | | 713/155 |
| 2012/0117376 A1* | 5/2012 | Fink | H04L 29/12433 |
| | | | 713/153 |
| 2012/0158725 A1 | 6/2012 | Molloy et al. | |
| 2013/0318570 A1* | 11/2013 | L. | H04L 63/20 |
| | | | 726/4 |
| 2016/0191365 A1 | 6/2016 | Wakeman et al. | |
| 2016/0234095 A1 | 8/2016 | Shetty et al. | |
| 2017/0264600 A1* | 9/2017 | Froelicher | H04L 63/062 |
| 2018/0288015 A1* | 10/2018 | Kudaraya | H04L 63/0442 |

OTHER PUBLICATIONS

Hong, Won-Kyu; Kim, Young-Il. An Integrated Network Management System for Provisioning the Efficient ATM Over ADSL Service. 2001 MILCOM Proceedings Communications for Network-Centric Operations: Creating the Information Force. https://ieeexplore.ieee.org/stamp/stamp.jsp?tp=&arnumber=985762 (Year: 2001).*

Mutneja, L.S.; Bhagat, A.P. Secured Transmission in Cooperative Groups Using Group Key Management Protocol. 2014 International Conference on Communication and Network Technologies. https://ieeexplore.ieee.org/stamp/stamp.jsp?tp=&arnumber=7062741 (Year: 2014).*

* cited by examiner

DISCOVERY OF SYSTEM WITH UNIQUE PASSWORDS BY MANAGEMENT CONSOLE

BACKGROUND

1. Technical Field

The present disclosure relates in general to managing an information handling system (IHS), and more particularly to a management console discovering IHSs of a datacenter for secure communication.

2. Description of the Related Art

As the value and use of information continue to increase, individuals and businesses seek additional ways to process and store information. One option available to users is information handling systems (IHSs). An IHS generally processes, compiles, stores, and/or communicates information or data for business, personal, or other purposes, thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs and particularly server IHSs are often deployed in data centers. Customers with medium to large data centers can use a management console for monitoring and provisioning of servers. The management console first needs to discover the individual servers that are to be managed for device configuration, updates, and continued health monitoring. Traditionally, management consoles have used a sweep discovery mechanism where a range of Internet Protocol (IP) addresses ("IPs") is examined and each device is contacted via a number of protocols for appropriate classification. Server IP discovery is a non-trivial setup for an administrator as generally-known discovery is a manual setup. Some protocol knowledge is required for device classification. The manual discovery is also time consuming and prone to errors should there be any network changes.

Current discovery mechanism involves sniffing the network. In particular, current auto-discovery mechanisms involves a complicated setup. The dynamic host configuration protocol (DHCP) vendor option configuration requires the system administrator to configure the vendor options to include a provisioning server IP. Other auto discovery mechanisms require an OS agent to be installed on the server. DHCP based methods are currently implicitly insecure due to lack of application of any encryption/decryption algorithms.

Increasingly, sweep discovery is not an option in many instances. A sweep discovery assumes uniform credentials per protocol for contacting the devices in the specified network ranges. With a trend toward servers having unique random passwords, the sweep discovery mechanism is increasingly a non-viable setup approach. In addition, customers, such as operators of a datacenter would have to have prior knowledge of IP-ranges of servers in a network. This requisite knowledge can be become more complex to remember with increasing reliance on IPv6 ranges that are longer than previous IPv4 addresses.

BRIEF SUMMARY

In accordance with embodiments of the present disclosure, an IHS includes at least one network interface coupled to at least one network for communication with a management console and one or more servers. A storage device has stored thereon group manager program code that executes on a processor. The group manager program code enables the IHS to perform functionality of a group manager server (GMS). The GMS maintains an inventory of respective link local Internet Protocol (IP) network address and public keys of each server known to the GMS that is addressable over the at least one network. The GMS receives, via the at least one network, an IP network address and credentials associated with a management console that similarly receives an IP network address and credentials associated with the GMS. The GMS requests a public key from the management console using the management console IP network address and credentials associated with the management console. The GMS receives the requested public key from the management console. The GMS transmits the IP network address and the public key of the management console to each server that is addressable over the at least one network. The GMS encrypts the inventory with the public key of the management console to generate an encrypted inventory. The GMS forwards the encrypted inventory to the management console to enable the management console to securely communicate with each server using asymmetric key cryptography.

According to illustrative embodiments of the present disclosure, a remote access controller (RAC) of an IHS includes a wide area network (WAN) interface coupled to a WAN for communication with a management console. A LAN interface is coupled to a LAN for communication with one or more servers. A storage device has stored thereon group manager program code that executes on a processor to enable the IHS to perform functionality of a GMS. The GMS maintains an inventory of respective link local Internet Protocol (IP) network address and public keys of each server known to the GMS that is addressable over the LAN. The GMS receives, via the WAN, an IP network address and credentials associated with a management console that similarly receives an IP network address and credentials associated with the GMS. The GMS requests a public key from the management console using the management console IP network address and credentials associated with the management console. The GMS receives the requested public key from the management console. The GMS transmits the IP network address and the public key of the management console to each server that is addressable over the LAN. The GMS encrypts the inventory with the public key of the management console to generate an encrypted inventory. The GMS forwards the encrypted inventory to the management console to enable the management console to securely communicate with each server using asymmetric key cryptography.

According to illustrative embodiments of the present disclosure, a method is provided for automating acquisition of link local IP network address of servers. In one or more embodiments, the method includes maintaining, by a GMS, an inventory of respective link local IP network address and public keys of each server known to the GMS that is addressable over the at least one network. The GMS receives, via the at least one network, an IP network address and credentials associated with a management console that similarly receives an IP network address and credentials associated with the GMS. The method includes requesting, by the GMS, a public key from the management console using the management console IP network address and credentials associated with the management console. The GMS receives the requested public key from the management console. The method includes transmitting, by the GMS, the IP network address and the public key of the management console to each server that is addressable over the at least one network. The GMS encrypts the inventory with the public key of the management console to generate an encrypted inventory. The method includes forwarding, by the GMS, the encrypted inventory to the management console to enable the management console to securely communicate with each server using asymmetric key cryptography.

The above presents a general summary of several aspects of the disclosure in order to provide a basic understanding of at least some aspects of the disclosure. The above summary contains simplifications, generalizations and omissions of detail and is not intended as a comprehensive description of the claimed subject matter but, rather, is intended to provide a brief overview of some of the functionality associated therewith. The summary is not intended to delineate the scope of the claims, and the summary merely presents some concepts of the disclosure in a general form as a prelude to the more detailed description that follows. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
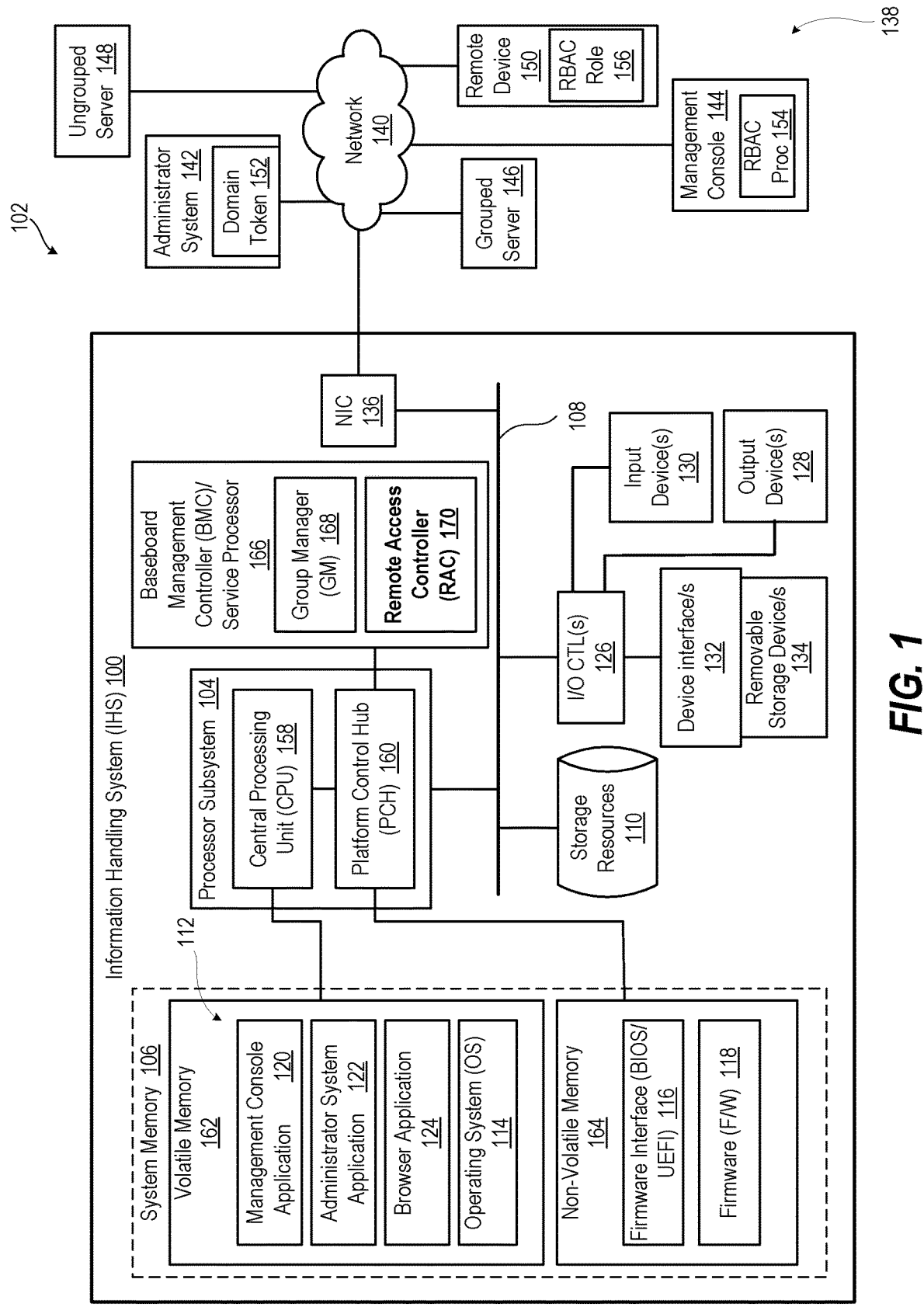
FIG. 1 illustrates a block diagram representation of an example information handling system (IHS) that operates within a network, according to one or more embodiments.

The present innovation enables discovery of network addresses and unique credentials or passwords that are not discoverable by sweeping a predictable range of addresses with one standard credential. An Information Handling System (IHS) has at least one network interface coupled to at least one network for communication with a management console and one or more servers. A storage device has stored thereon group manager program code that executes on the processor to enable the IHS to perform functionality of a group manager server (GMS). The GMS maintains an inventory of a respective link local Internet Protocol (IP) network address and public key of each server known to the GMS that is addressable over the at least one network. The GMS receives, via the at least one network, an IP network address and credentials associated with a management console. Similarly the management console receives an IP network address and credentials associated with the GMS. The GMS requests a public key from the management console using the management console IP network address and credentials associated with the management console. The GMS receives the requested public key from the management console and encrypts the inventory with the public key of the management console to generate an encrypted inventory. The GMS transmits the IP network address and the credentials of the management console to each server that is addressable over the at least one network. The GMS forwards the encrypted inventory to the management console to enable the management console to request a public key of each server for secure communication using asymmetric key cryptography.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

FIG. 1 illustrates an IHS 100 that is functions within a network 102. Within the general context of IHSs, the IHS 100 may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring again to FIG. 1, IHS 100 includes processor subsystem 104 coupled to system memory 106 via system interconnect 108. System interconnect 108 can be interchangeably referred to as a system bus, in one or more embodiments. System interconnect 108 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus. System interconnect 108 communicatively couples various system components including, for example, replaceable local storage resources 110, such solid state drives (SDDs) and hard disk drives (HDDs). Within local storage resources 110 can be stored one or more software and/or firmware modules and one or more sets of data that can be utilized during operations of IHS 100. Specifically, in one embodiment, system memory 106 can retrieve from local storage resources 110 a plurality of such modules for execution by processor subsystem 104. The modules can include one or more of application(s) 112, operating system (OS) 114, a firmware interface 116 such as basic input/output system (BIOS) or Uniform Extensible Firmware Interface (UEFI), and platform firmware (FW) 118. These software and/or firmware modules have varying functionality when their corresponding program code is executed by processor subsystem 104 or secondary processing devices within IHS 100. For example, application(s) 112 may include a management console application 120, an administrator system application 122, and a browser application 124, each enabling IHS 100 to operate in one or more of the corresponding roles within network 102.

I/O controllers 126 also support connection to and forwarding of output signals to one or more connected output devices 128, such as a monitor or display device or audio speaker(s). Additionally, in one or more embodiments, one or more input devices 130, such as an optical reader, a USB, a card reader, Personal Computer Memory Card International Association (PCMCIA) slot, and/or a high-definition multimedia interface (HDMI), can be associated with IHS 100. Device interface(s) 132 can be utilized to enable data to be read from or stored to corresponding removable storage device/s 134, such as a compact disk (CD), digital video disk (DVD), flash drive, or flash memory card. In one or more embodiments, device interface(s) 132 can further include general purpose I/O interfaces such as inter-integrated circuit ($I^2C$), system management bus (SMB), and peripheral component interconnect (PCI) buses.

IHS 100 comprises a network interface controller (NIC) 136. NIC 136 enables IHS 100 and/or components within IHS 100 to communicate and/or interface with other devices, services, and components that are located external to IHS 100, represented as network devices 138. These devices, services, and components can interface with IHS 100 via an external network, such as example network 140, using one or more communication protocols that include transport control protocol (TCP/IP) and network block device (NBD) protocol. Network 140 can be a local area network, wide area network, personal area network, and the like, and the connection to and/or between network and IHS 100 can be wired, wireless, or a combination thereof. For purposes of discussion, network 140 is indicated as a single collective component for simplicity. However, it should be appreciated that network 140 can comprise one or more direct connections to other devices as well as a more complex set of interconnections as can exist within a local area network or a wide area network, such as the Internet.

According to the illustrative embodiment, network devices 138 are IHSs that are being utilized in a particular role or capacity within the network 102. An administrator system 142, provided as one of the network devices 138, can prompt communication between a management console 144, the IHS 100 as group manager system (GMS), grouped servers 146, and ungrouped servers 148. For clarity, IHS 100 can represent any of the network devices 138. For example IHS 100 can execute the administrator system application 122 to perform the role of administrator system 142. In an exemplary embodiment, IHS 100 is a particular grouped server acting as GMS to perform the functions and methods described herein according to the present innovation. In particular, IHS 100 facilitates secure communication of the network addresses and credentials of grouped servers 146 and ungrouped servers 148, enabling the management console 144 to initiate requests for public keys from the grouped servers 146 and ungrouped servers 148 in preparation for secure communication.

According to one aspect of the disclosure, secure communication among the network devices 138 and IHS 100 is enabled by public key cryptography, or asymmetric cryptography. Public key cryptography is any cryptographic system that uses pairs of keys: public keys, which may be disseminated widely; and private keys, which are known only to the owner. This use of public key cryptography accomplishes two functions: authentication, which is the use of the public key to verify that a holder of the paired private key sent the message; and encryption, whereby only the holder of the paired private key can decrypt the message encrypted with the public key. In a public key encryption system, any person can encrypt a message using the public key of the receiver, but such a message can be decrypted only with the receiver's private key. For this system to work, generation of a public and private key-pair to be used for encryption and decryption must be computationally easy for a user to complete.

With secure communication established, administrator system 142 can also limit how certain servers can be accessed and utilized by other remote devices 150. In one or more embodiments, the administrator system 142 shares a domain token 152 with the IHS 100 operating as GMS and with the grouped servers 146 to create a domain. Remote device 150 would be required to include a corresponding domain token 152 in communication requests with the IHS 100 and the grouped servers 146 enabling a response. In one or more embodiments, the IHS 100 and network devices 138 can perform role based access controls (RBAC). As illustrated, management console 144 executing an RBAC procedure utility 154 assigns an RBAC role 156, such as device manager, to remote device 150.

In computer systems security, role-based access control (RBAC) is an approach to restricting system access to only authorized users. RBAC is generally used by enterprises with more than 500 employees, and can implement mandatory access control (MAC) or discretionary access control (DAC). RBAC is sometimes referred to as role-based security. Role-based-access-control (RBAC) is a policy neutral access control mechanism defined around roles and privileges. The components of RBAC such as role-permissions, user-role, and role-role relationships make the performance of user assignments simple. RBAC can be used to facilitate administration of security in large organizations with hundreds of users and thousands of permissions. RBAC is different from MAC and DAC access control frameworks, but is able to enforce these policies without any complication. RBAC can segregate devices into groups with access to specific information and keep each group from accessing the other group's information.

Processor subsystem 104 can include a central processing unit (CPU) 158 that is augmented by a platform control hub (PCH) 160. CPU 158 can execute applications 112 and OS 114 in volatile memory 162 of system memory 106. PCH 160 interfaces with functional components of the IHS 100, such as non-volatile (NV) memory 164 of the system memory 106, firmware interface 116, platform firmware 118, and a baseboard management controller (BMC)/service processor 166. BMC/service processor 166 can include and execute program code such as a group manager application 136 that provides functionality for IHS 100 to perform as a GMS within the network 102. BMC/service processor 166 can also include a remote access controller (RAC) 170 enabling out-of-band communication for the IHS 100 by the baseboard management controller (BMC)/service processor 128 via the NIC 136 and network 140 to the network devices 138.

By contrast, the present innovation replaces the manual process of system discovery. RACs 170 enable agent-less dynamic discovery of the servers. The management consoles 144 can get the system information by accessing RACs 170 even when the OS 114 on the IHS 100 is inactive. The present innovation provides a secure way to discover servers within a networked without snooping the network. The secure discovery features disclosed herein are scalable, less error prone, and reduces downtime. The present innovation is not limited to unprovisioned "bare metal" new installations, and can be back-ported to previous generations of IHSs 100. Additionally, the present innovation does not require inputs from the user, such as ranges for sweeping, protocol configuration, or normalized credentials for discovery.

Figure 2:
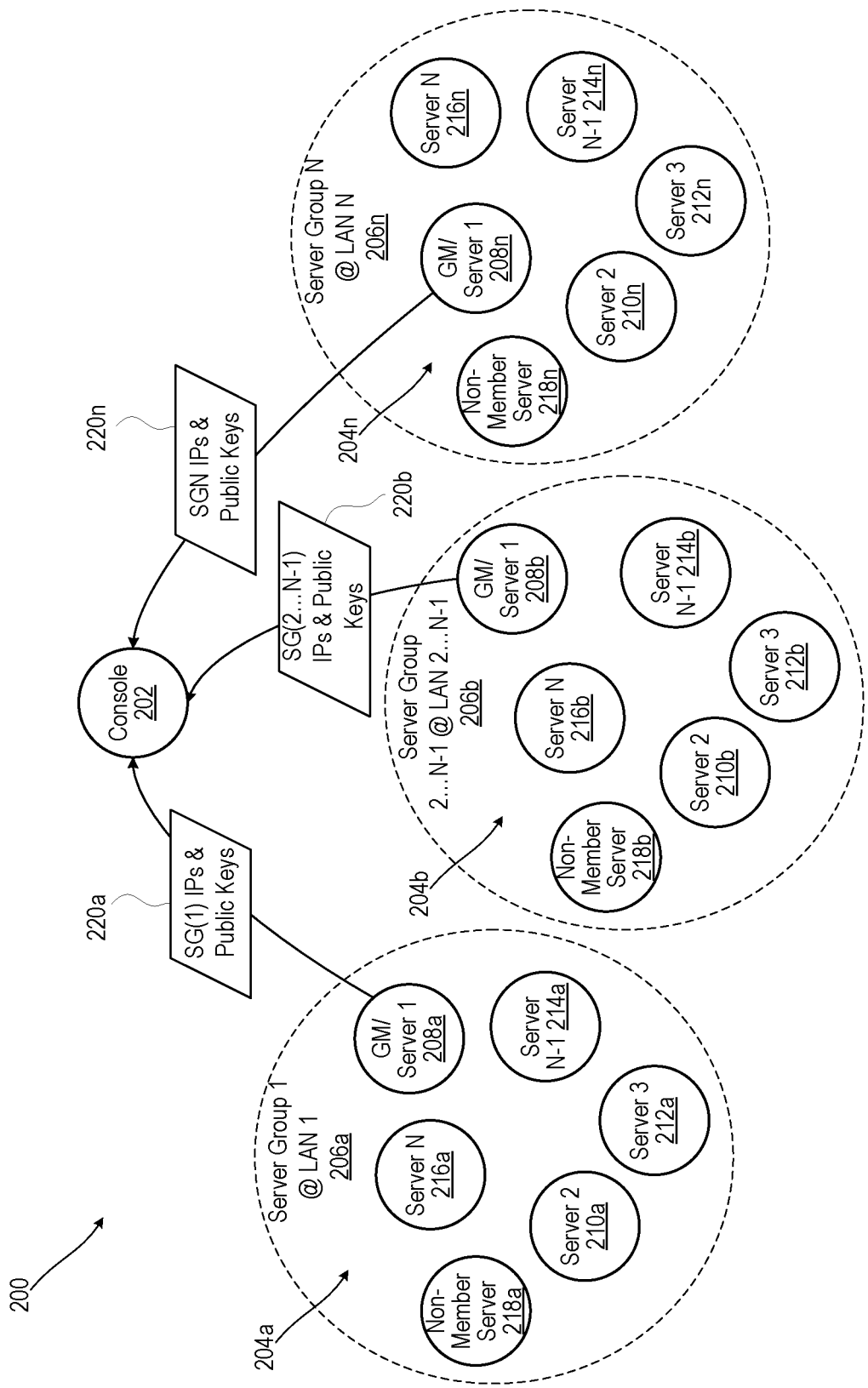
FIG. 2 illustrates a communication diagram representation of groups of servers and a management console, according to one or more embodiments.

FIG. 2 illustrates a network 200 having a management console 202 that discovers servers 204a in server group 1 206a, servers 204b in server group 2 . . . N−1 206b, and servers 204n in server group N 206n. Server group 1 206a can contain grouped servers, illustrated as GMS server 1 208a, grouped server 2 210a, grouped server 3 212a, grouped server N−1 214a, and grouped server N 216a. Server group 206a can include ungrouped servers or non-member servers 218a. Server group 1 206a can contain grouped servers, illustrated as GMS server 1 208a, grouped server 2 210a, grouped server 3 212a, grouped server N−1 214a, and grouped server N 216a. Server group 1 206a can include ungrouped servers or non-member servers 218a. Server group(s) 2 . . . N−1 206b can contain grouped servers, illustrated as GMS server 1 208b, grouped server 2 . . . N−1 210b, grouped server 3 212b, grouped server N−1 214b, and grouped server N 216b. Server group(s) 2 . . . N−1 206b can include ungrouped servers or non-member servers 218b. Server group N 206n can contain grouped servers, illustrated as GMS server 1 208n, grouped server 2 210n, grouped server 3 212n, grouped server N−1 214n, and grouped server N 216n. Server group N 206n can include ungrouped servers or non-member servers 218n.

Once management console 202 is in secure communication with the GMS server 1 208a, the GMS server 1 208a provides the IP addresses and credentials 220a for the other servers 204a in server group 1 206a. Once management console 202 is in secure communication with the GMS server(s) 2 . . . N−1 208b, the GMS server(s) 2 . . . N−1 208b provide the IP addresses and credentials 220b for the other servers 204b in server group(s) 2 . . . N−1 206b. Once management console 202 is in secure communication with the GMS server N 208n, the GMS server N 208n provides the IP addresses and credentials 220n for the other servers 204n in server group N 206n. The IP addresses and credentials 220a, 220b, 220n enable the management console 202 to request the public keys from respective servers 204a, 204b, 204n that already have received the public key for the management console 202 from their respective GMS server 208a, 208b, 208n.

Figure 3A:
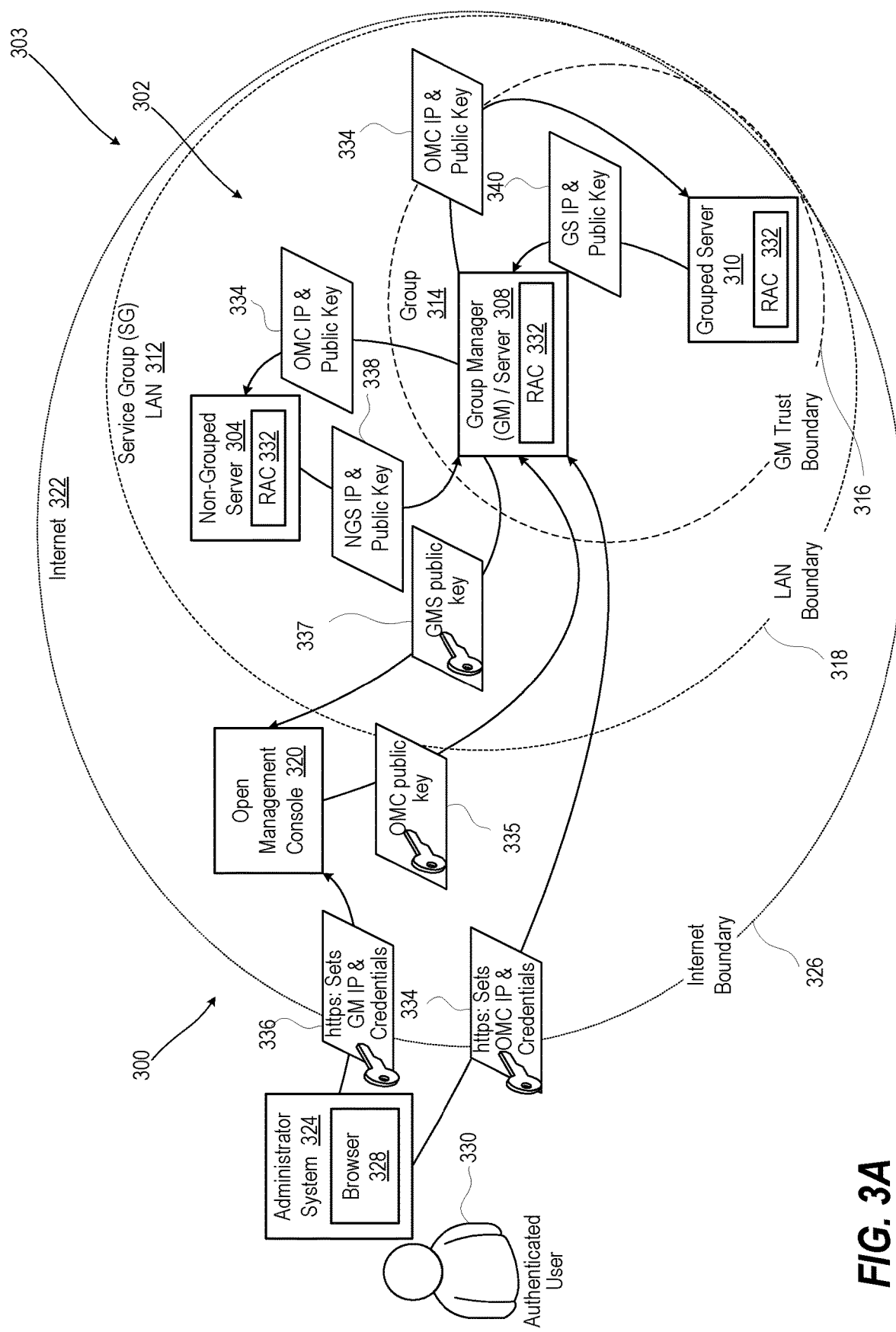
FIG. 3A illustrates a communication diagram representation of an initial state of discovery in a network between an administrator system, a management console, a group manager server (GMS), one or more grouped servers, and one or more un-grouped servers, according to one or more embodiments.
Figure 3B:
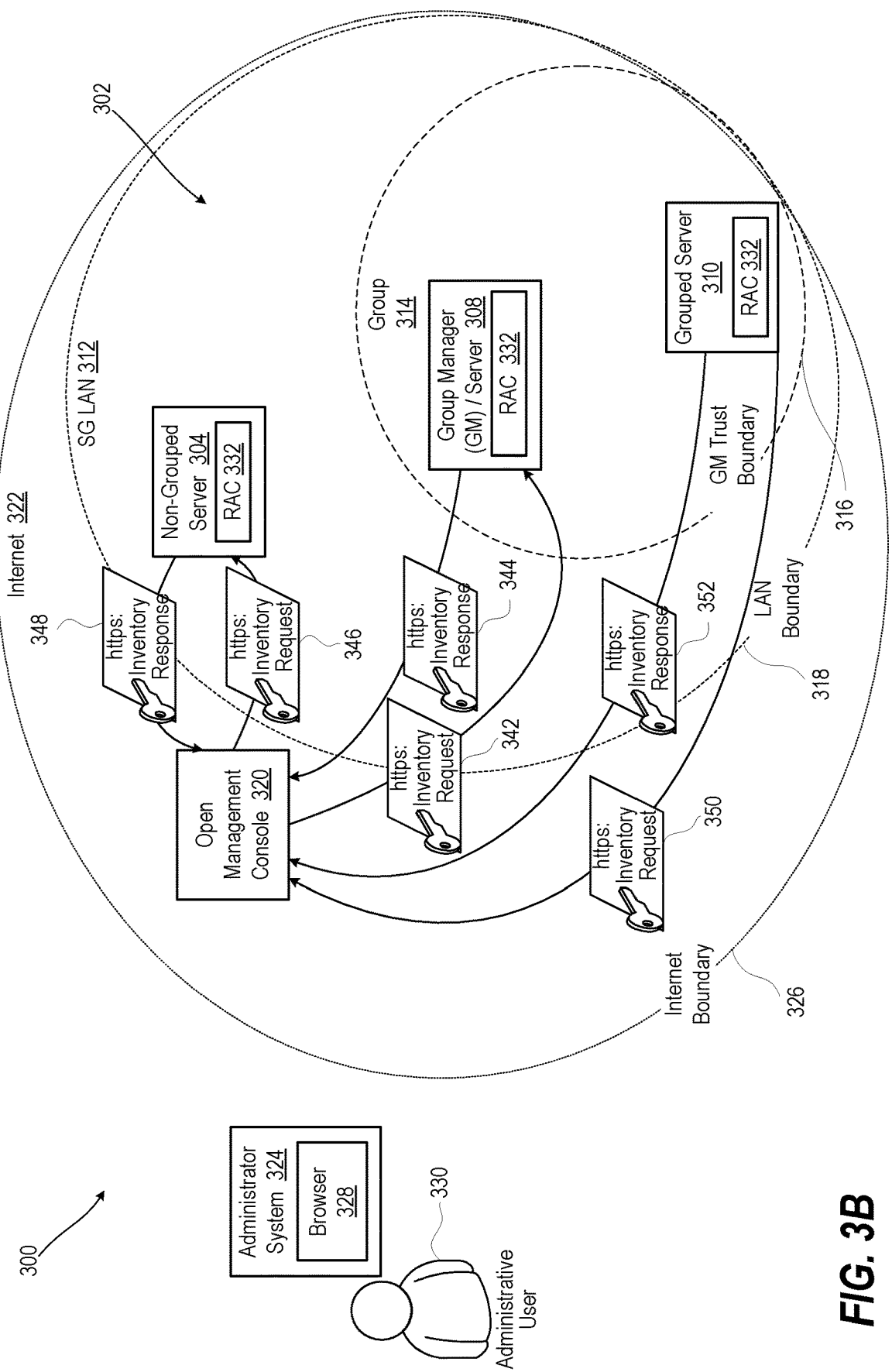
FIG. 3B illustrates a communication diagram representation of a subsequent state of discovery in the network of FIG. 3A, according to one or more embodiments.

FIGS. 3A-3B illustrate a network, such as a WAN 300, within which servers 302 are discoverable. The servers 302 can be part of a datacenter 303. To support a full description of the functional features, the servers 302 include a non-grouped server 304, a group manager (GM) server 308, and a grouped server 310 that are all communicatively coupled within a server group (SG) LAN 312 having a LAN boundary 318. GM server 308 and grouped server 310 are members of a group 314 that is interconnected via LAN 312. A GM trust boundary 316 separates the non-grouped server 306 from the GM server 308 and grouped server 310. Outside of LAN boundary 318, an open management console (OMC) 320 operates within an Internet region 322 of the network 300. An administrator system 324 is located outside of an Internet boundary 326 of the Internet region 322. The administrative system 324 executes a browser 328 to perform certain administrative functions initiated by an administrative user 330 via the browser 328. According to one aspect of the present disclosure, each server 302 has a RAC 332 that is accessible via an IP network address via the WAN 300 for out-of-band communication to assist in discovery of the respective server and other functions, even if the server is generally powered down.

FIG. 3A illustrates initial operations of discovery of the servers 302. The administrator system 324 is already in secure communication with the OMC 320 and the GM server 308. Using the browser 328, the administrator system 324 securely sends the OMC IP network address and credentials 334 to the GM server 308. The administrator system 324 securely sends the GM server IP network address and GM credentials 336 to the OMC 320. The GM server 308 already has or later discovers the non-grouped server (NGS) IP network address and public key 338 from the non-grouped server 304 and the grouped server (GS) IP network address and public key 340 from the grouped server 310. In response to receiving the OMC IP network address and OMC credentials 334, the GM server 308 sends a GMS public key 335 to the OMC 320. The OMC 320 sends an OMC public key 337 to the GM server 308.

FIG. 3B illustrates that the OMC 320 can then securely communicate an inventory request 342 to the GM server 308. GM server 308 responds with a secure inventory response 344. In this instance the secure inventory response 344 can include an encrypted inventory with IP network addresses and public keys for the servers 304, 310. The OMC 320 can securely send an inventory request 346 to the non-grouped server 304 and receive an inventory response 348. The OMC 320 can also securely send an inventory request 350 to the grouped server 310 and receive an inventory response 352. The OMC 320 communicates directly with each RAC 332, making use of available asymmetric key based secure transport layer.

Figure 4:
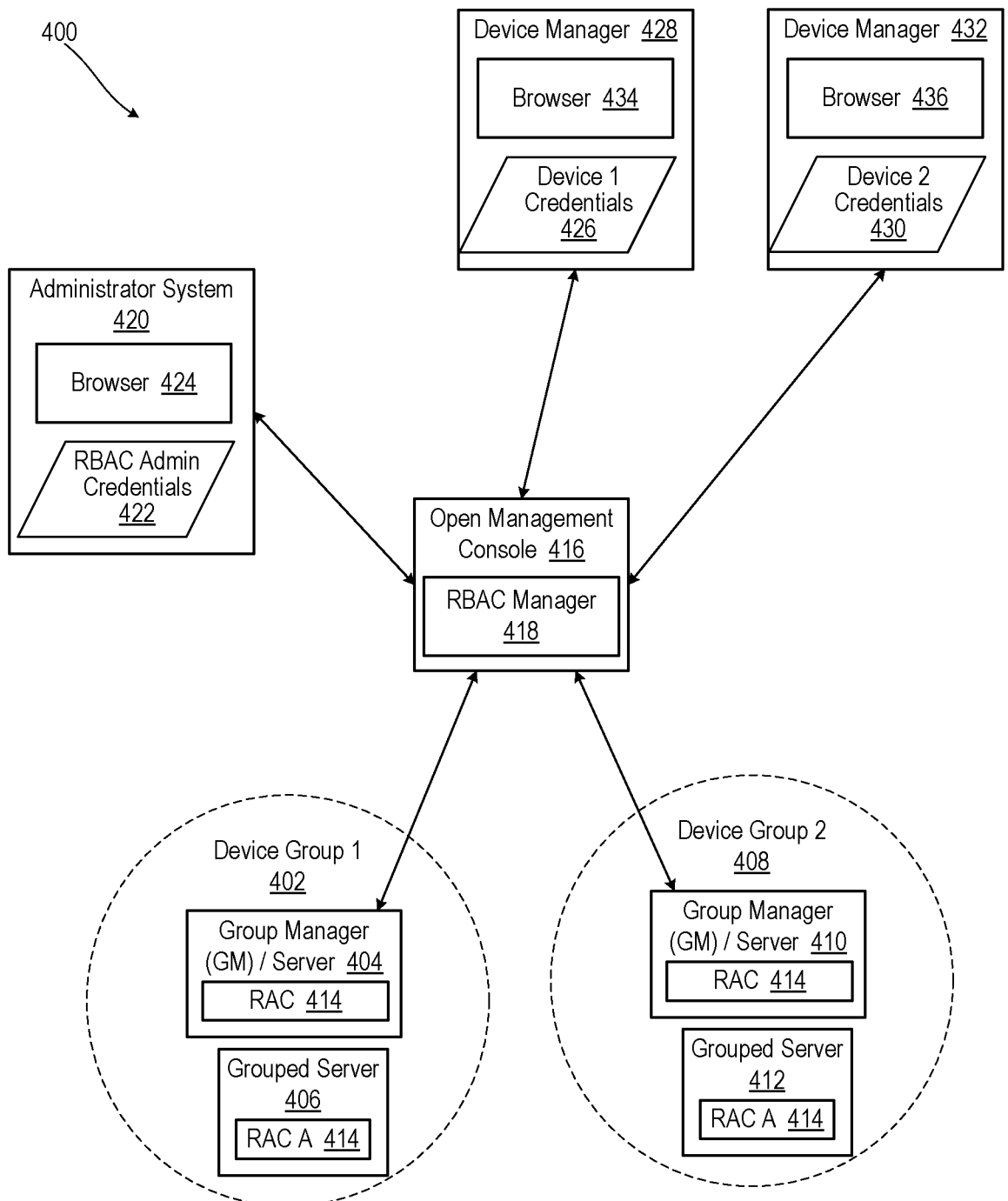
FIG. 4 illustrates a communication diagram representation of a network incorporating role-based access procedures (RBAC), according to one or more embodiments.

FIG. 4 illustrates implementing RBAC procedures in addition to the discovery abilities illustrated in FIGS. 3A-3B. A network 400 communicatively couples a first device group 1 402 with a GM server 404 and one or more grouped servers 406. The network communicatively couples second device group 2 408 with a GM server 410 and one or more grouped servers 412. Each server 404, 406, 410, 412 has a RAC 414 for communicating with management console 416 provisioned with RBAC manager 418 via the network 400. An administrator system 420 has RBAC administrative credentials 422 that enable communicating via a browser 424 to RBAC manager 418 over the network 400 to assign device 1 credentials 426 to a device manager 428 and to assign device 2 credentials 430 to a device manager 432. Device manager 428 can utilize device 1 credentials 426, such as in a browser 434, to access device group 1 402. Device manager 428 lacks credentials to access device group 2 408. Device manager 432 can utilize device 2 credentials 430, such as in a browser 436, to access device group 2 408. Device manager 432 lacks credentials to access device group 1 402.

Figure 5:
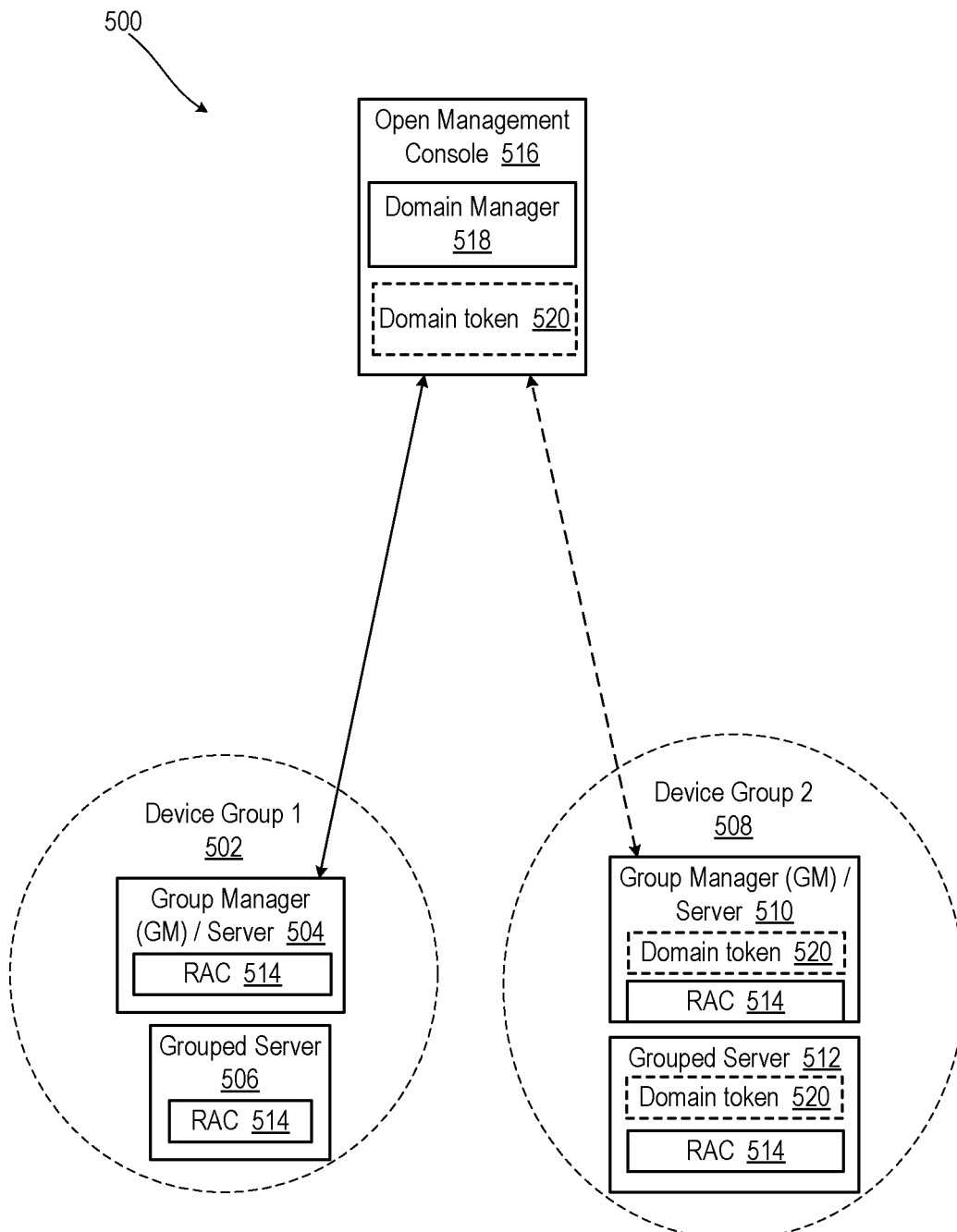
FIG. 5 illustrates a communication diagram representation of a network incorporating domain token authorization, according to one or more embodiments.

FIG. 5 illustrates implementing a domain procedure in addition to the discovery abilities illustrated in FIGS. 3A-3B within network 500. Network 500 includes: a first device group 1 502 having a GM server 504 and one or more grouped servers 506; and a second device group 2 508 having a GM server 510 and one or more grouped servers 512. Each server 504, 506, 510, 512 has a RAC 514 for communicating with an open management console 516, which is provisioned with a domain manager 518. GM server 510 and one or more grouped servers 512 of the second device group 2 508 are provisioned with domain tokens 520 that are required to be included in communication requests from the open management console 516.

Figure 6:
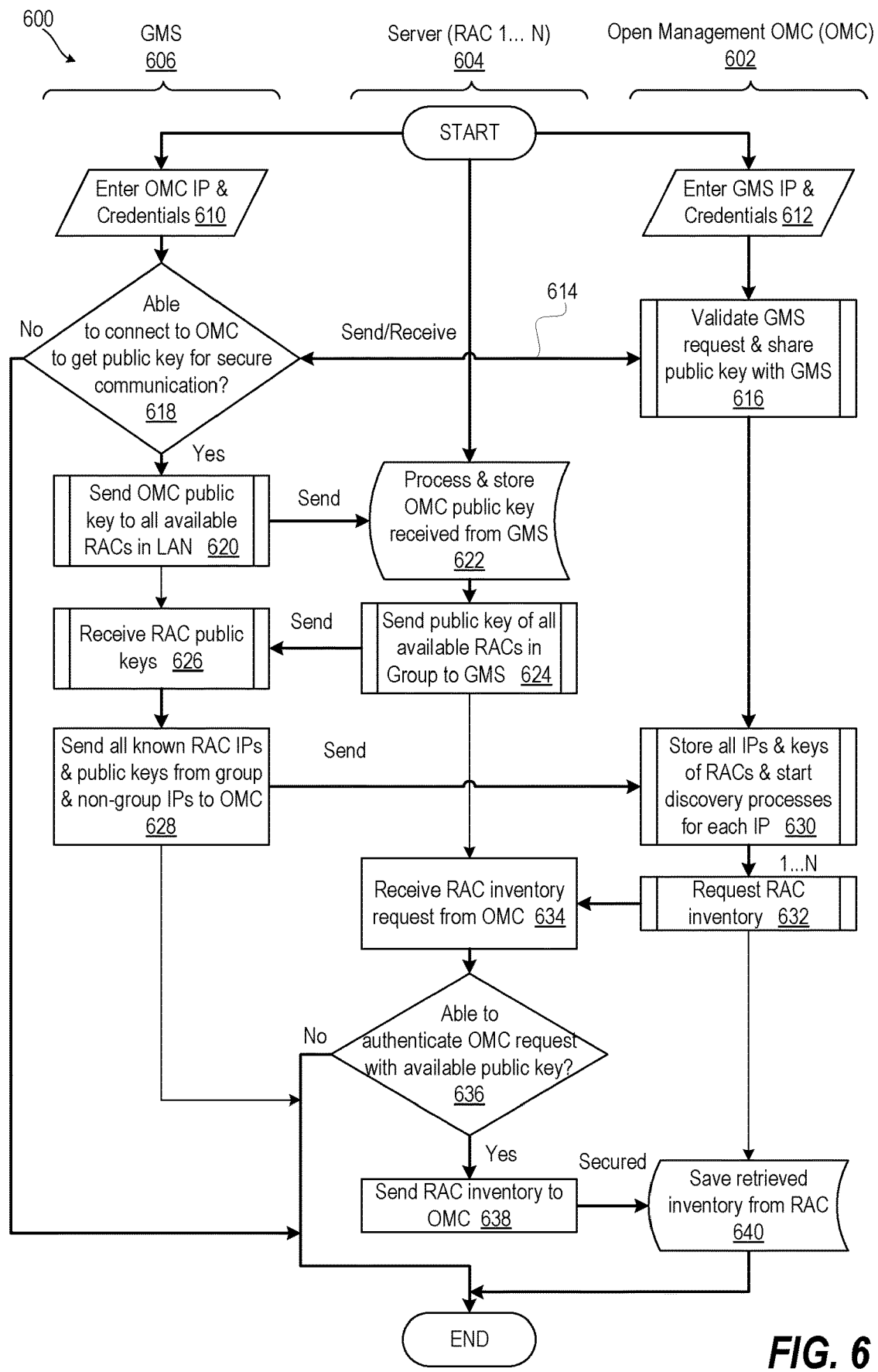
FIG. 6 illustrates a sequence diagram of a method of establishing asymmetric key secure communication between a management console and a group of servers, according to one or more embodiments.

FIG. 6 illustrates a sequence flow of a method 600 of establishing secure communication between an OMC 602 and one or more servers 604 facilitated by a group manager server 606, according to one or more embodiments. Method 600 begins with an OMC IP network address and credentials, such as a public key, being entered in the GMS 606 by an administrator system (block 610). The administrator system enters a GMS IP network address, and credentials in the OMC 602 (block 612). The GMS 606 requests the public key from the OMC 602 using the OMC IP network address and credentials, as indicated at bidirectional arrow 614. OMC 616 validates the GMS request and shares the public key with GMS 606, as indicated by bidirectional arrow 614. GMS 606 determines whether the GMS 606 is able to connect to the OMC to get the public key for secure communication (decision block 618). If not able to connect to the OMC 602, method 600 ends. If able to connect to the OMC 602, GMS 606 sends OMC public key to all available RACs in LAN (block 620). One or more servers 604 process and store the OMC public key received from the GMS 606 (block 622). One or more servers 604 of all available RACs in the group send their respective public key to the GMS (block 624). The GMS 606 receives RAC public keys (block 626). GMS sends all known RAC IPs and public keys from group and non-group IPs to the OMC 602 (block 628). The OMC 602 stores all IPs and public keys of RACs and starts discovery processes for each IP (block 630). OMC 606 requests RAC inventory from the one or more servers 604 (block 632). The one or more servers 606 receives RAC inventory request from OMC 602 (block 634). The one or more servers 604 determine whether the one or more servers are able to authenticate OMC request for available public key (decision block 636). If the one or more servers are not able to authenticate, method 600 ends. If able to authenticate, the one or more servers 604 securely send RAC inventory to OMC 602 (block 638). OMC 602 saves retrieved inventory from RAC 602 (block 640). Then method 600 ends.

IHS 100 (FIG. 1) performs different aspects of the processes that enable the one or more embodiments of the disclosure. Generally, methods 700, 800, 900 represent computer-implemented methods. The description of methods 700, 800, 900 is provided with general reference to the specific components illustrated within FIG. 1.

Figure 7:
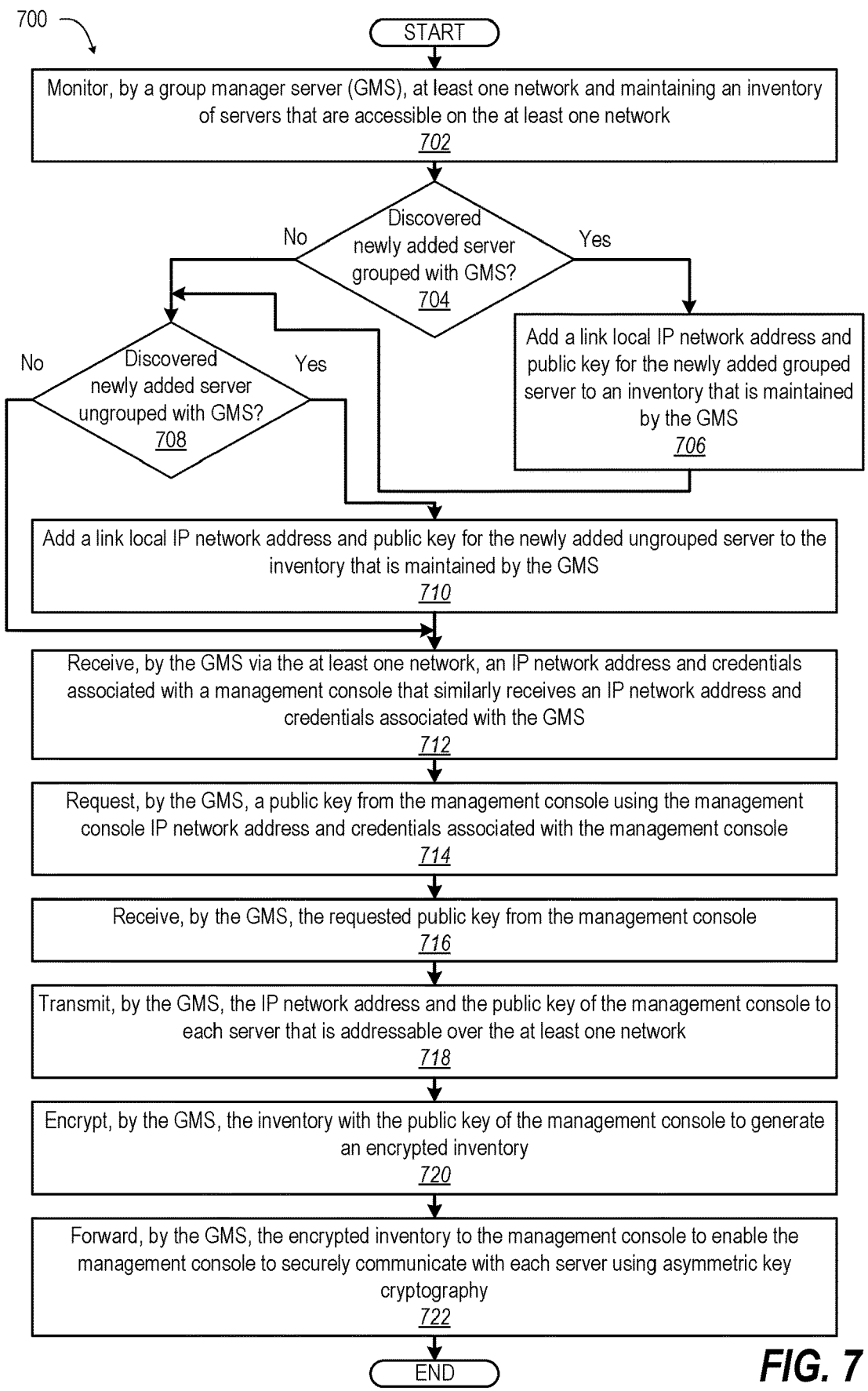
FIG. 7 illustrates a flow diagram of a method of group manager facilitated discovery of servers by a management console, according to one or more embodiments.

FIG. 7 illustrates a method 700 of automating acquisition of link local IP network address of servers. In one or more embodiments, the method 700 includes monitoring, by a GMS, at least one network and maintaining an inventory of servers that are accessible on the at least one network (block 702). A determination is made as to whether the GMS has discovered a newly added grouped server (decision block 704). In response to determining that a newly added server is discovered, the GMS adds a link local IP network address and public key for the newly added server to an inventory that is maintained by the GMS (block 706). A determination is made as to whether the GMS has discovered an ungrouped server (decision block 708). In an exemplary embodiment, this determination is made by receiving a publication from at least one server using multicast domain name system service discovery (mDNS-SD) protocol. In response to determining in decision block 706 that no newly added server is detected, method 700 also proceeds to block 708 to determine whether any ungrouped server is identified. In response to determining that no ungrouped server is detected in decision block 708, method 700 proceeds to block 712. In response to determining in decision block 708 that a server is identified that is not grouped, the GMS adds the IP network address and public key for the ungrouped server to the inventory (block 710). At block 712, method 700 includes receiving, by the GMS via the at least one network, an IP network address and credentials associated with a management console. The management console similarly receives an IP network address and credentials associated with the GMS. In an exemplary embodiment, the GMS performs out-of-band communication by a RAC that has the functionality of the GMS to receive the credentials and IP network addresses of a management console from an administrator system via a WAN. Method 700 includes requesting, by the GMS, a public key from the management console using the management console IP network address and credentials associated with the management console (block 714). The GMS receives the requested public key from the management console (block 716). The management console recognizes the GMS having previously received the IP network address and credential associated with the GMS. The method 700 includes the GMS transmitting, by the GMS, the IP network address and the public key of the management console to each server that is addressable over the at least one network (block 718). The GMS encrypts the inventory with the public key of the management console to generate an encrypted inventory (block 720). The method includes forwarding, by the GMS, the encrypted inventory to the management console to enable the management console to securely communicate with each server using asymmetric key cryptography (block 722).

Figure 8:
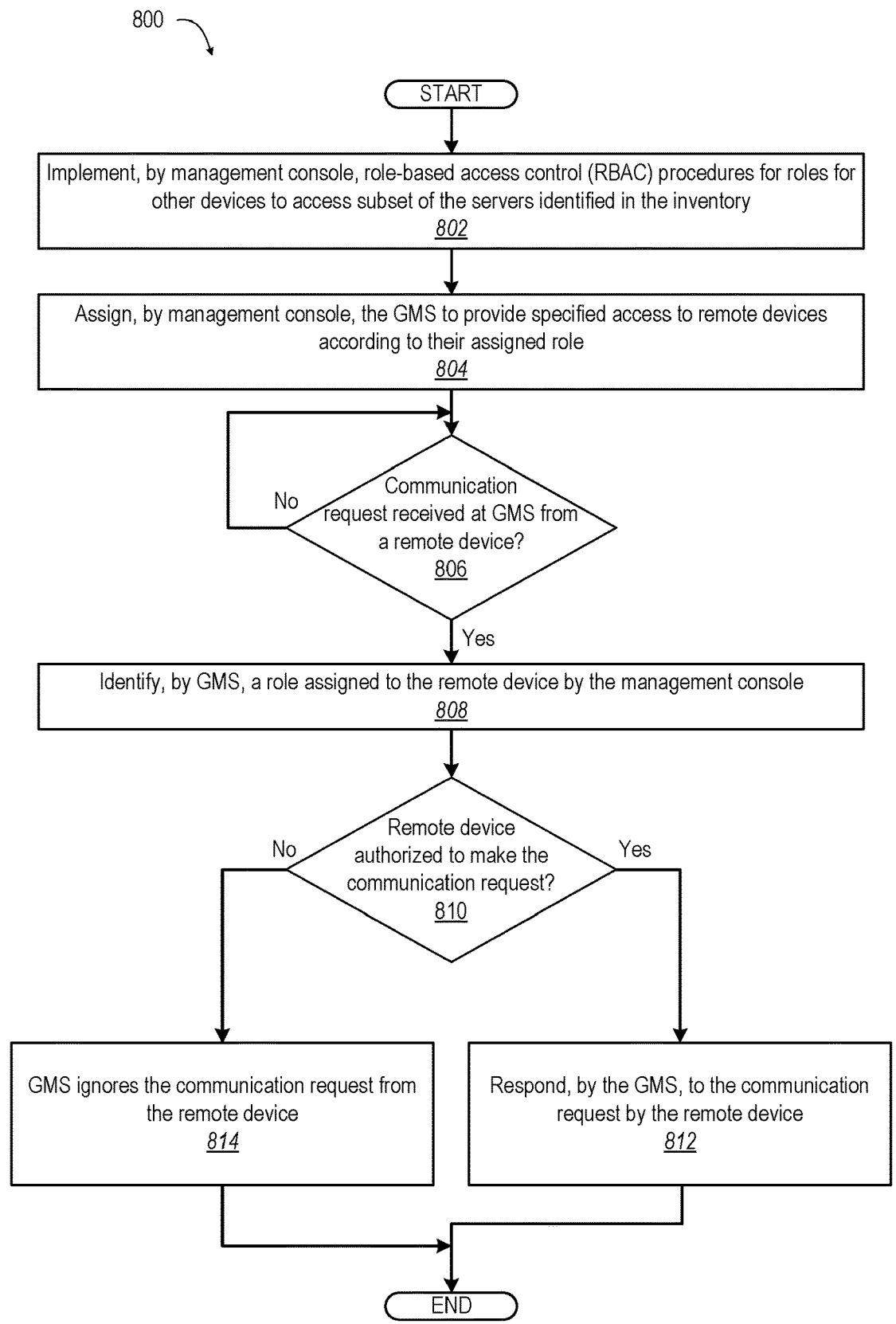
FIG. 8 illustrates a flow diagram of a method of adding RBAC to the method of group manager facilitated discovery of FIG. 7, according to one or more embodiments.

FIG. 8 illustrates an example method 800 of segregating certain groups of servers for use only by users having appropriate credentials even if discoverable according to method 700 (FIG. 7). Method 800 begins with management console implementing role-based access control (RBAC) procedures for roles for other devices to access a subset of the servers identified in the inventory (block 802). Management console enables the GMS to provide specified access to remote devices according to their assigned role (block 804). For clarity, method 800 is directed to communications between remote devices and the GMS of one group of servers. The management console can similarly enable the servers grouped with the GMS to provide specified access to remote devices according to their assigned role. In addition, the management console can enable another GMS with a corresponding subset of servers grouped with the other GMS to provide specified access to different remote devices according to another assigned role. For example, the roles for the GMS and the other GMS can relate to respectively to different business functions such as finance and human resources. The roles can specify what type limitations are placed on the access, such as the ability to read but not write data. With continued reference to FIG. 8, GMS determines whether a communication request is received from a remote device (decision block 806). In response to determining that a communication request is not received from a remote device, method 800 returns to block 806 to continue waiting for a communication request. In response to determining that a communication request is received from a remote device, GMS identifies a role assigned to the remote device by the management console (block 808). A determination is made by the GMS as to whether the role of the remote device is authorized to make the communication request to the GMS according to RBAC procedures (decision block 810). In response to the determination the remote device is authorized, the GMS responds to the communication request by the remote device (block 812). Then method 800 ends. In response to the determination the GMS is not authorized, the GMS ignores the communication request from the remote device (block 814). Then method 800 ends.

Figure 9:
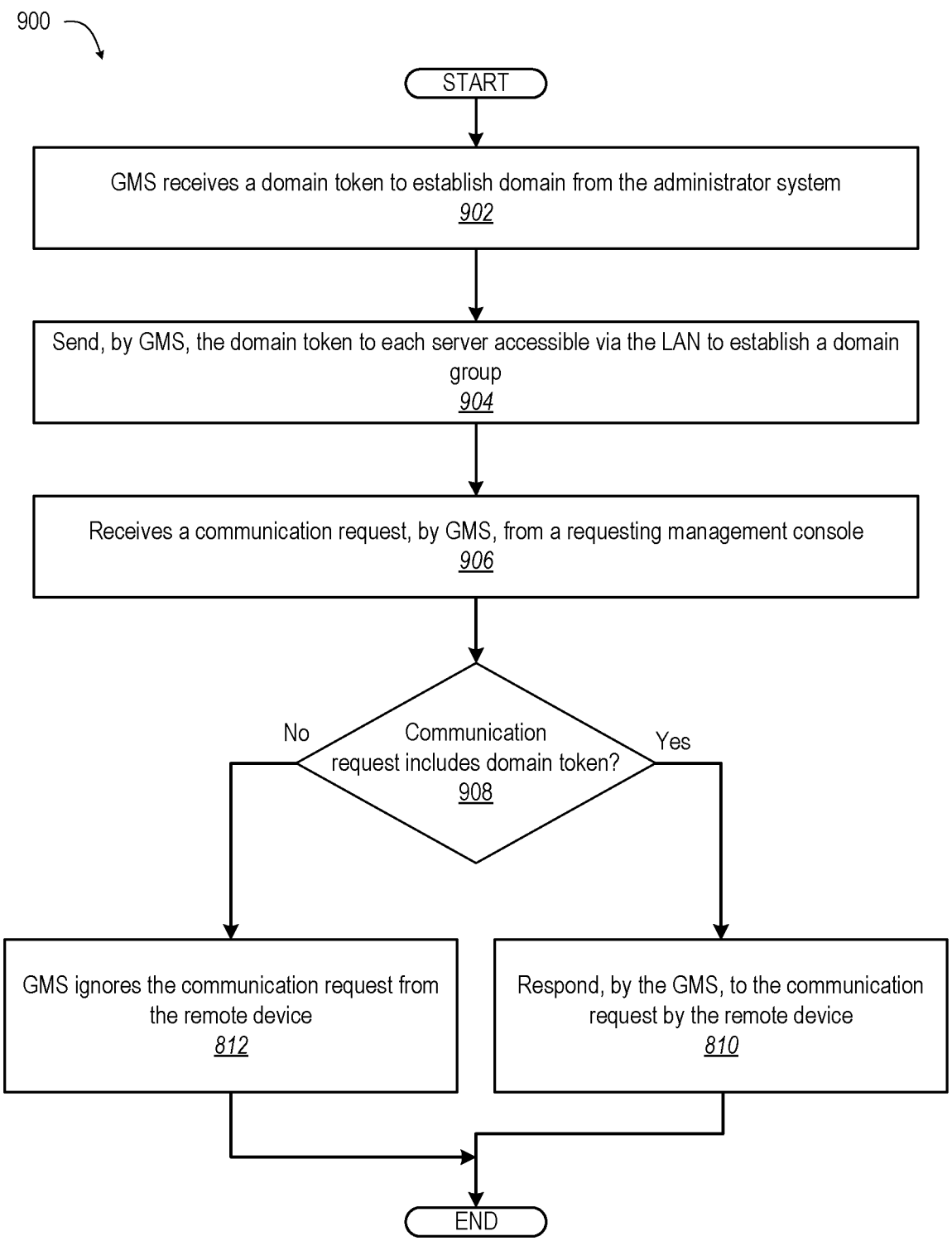
FIG. 9 illustrates a flow diagram of a method of adding domain token authorization to the method of group manager facilitated discovery of FIG. 7, according to one or more embodiments.

FIG. 9 illustrates an example method 900 of segregating certain groups of servers for use only by users having appropriate credentials even if discoverable according to method 700 (FIG. 7). GMS receives a domain token to establish a domain (block 902). For example, the administrator system can send the domain token as part of the discovery process. Method 900 includes the GMS sending the domain token to each server accessible via the LAN to establish a domain group (block 904). GMS receives a communication request from a requesting management console (block 906). In response to receiving the communication request, the GMS determines whether the communication request includes the domain token, indicating that the requesting management console is domain authorized (decision block 908). In response to determining that the communication request includes the domain token, the GMS responds to the communication request (block 910). Then method 900 ends. In response to determining that the communication request does not include the domain token, the GMS ignores the communication request (block 912). Then method 900 ends.

In the above described flow charts of FIG. 7-9, one or more of the methods may be embodied in a controller that performs a series of functional processes. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. An Information Handling System (IHS) comprising:
at least one network interface coupled to at least one network for communication with a management console and one or more servers;
a processor; and
a storage device having stored thereon group manager program code that executes on the processor to enable the IHS to perform functionality of a group manager server (GMS), wherein the GMS:
maintains an inventory of respective link local Internet Protocol (IP) network address and public keys of each server known to the GMS that is addressable over the at least one network;
receives, via the at least one network, an IP network address and credentials associated with a management console that receives an IP network address and credentials associated with the GMS;
requests a public key from the management console using the management console IP network address and credentials associated with the management console;
receives the requested public key from the management console;
transmits the IP network address and the public key of the management console to each server that is addressable over the at least one network;
encrypts the inventory with the public key of the management console to generate an encrypted inventory; and
forwards the encrypted inventory to the management console to enable the management console to securely communicate with each server using asymmetric key cryptography.

2. The IHS of claim 1, wherein:
the first network interface comprises a wide area network (WAN) interface coupled to a WAN for communication with an administrator system and the management console; and
the IP network address and the credentials associated with the management console are received from an administrator system via the WAN.

3. The IHS of claim 2, further comprising a remote access controller (RAC) that includes the processor and the storage device and that is coupled with the WAN at the GMS IP network address for out-of-band communication with the management console, administrative system and a respective RAC of the servers.

4. The IHS of claim 1, wherein the GMS:
in response to monitoring the at least one network:
discovers an added server;
adds the link local IP network address for the added server to the inventory;
encrypts at least an updated portion of the inventory with the public key of the management console to generate an encrypted inventory update; and
sends the encrypted inventory update to the management console to enable communication between the management console and the added server using asymmetric key encryption.

5. The IHS of claim 4, wherein:
the added server is ungrouped with the GMS; and
in response to monitoring the at least one network, the GMS receives a publication from the at least one server using multicast domain name system service discovery (mDNS-SD) protocol.

6. The IHS of claim 1, wherein the GMS, in response to receiving a request from a remote device for access to the GMS:
identifies a role assigned to the remote device by the management console; and
responds to the remote device according to role-based access control (RBAC) procedures based on the role assigned to the device.

7. The IHS of claim 1, wherein the GMS:
receives a domain token;
sends the domain token to each server accessible via the LAN to establish a domain group;
receives a communication request from a requesting management console;
in response to receiving the communication request, determines whether the communication request includes the domain token, indicating that the requesting management console is domain authorized;
in response to determining that the communication request includes the domain token, responds to the communication request; and
in response to determining that the communication request does not include the domain token, ignores the communication request.

8. A remote access controller (RAC) of an Information Handling System (IHS), the RAC comprising:
a wide area network (WAN) interface coupled to a WAN for communication with a management console;
a local access network (LAN) interface coupled to a LAN for communication with one or more servers;
a processor; and
a storage device having stored thereon group manager program code that executes on the processor to enable the IHS to perform functionality of a group manager server (GMS), wherein the GMS:
maintains an inventory of respective link local Internet Protocol (IP) network address and public keys of each server known to the GMS that is addressable over the LAN;
receives, via the WAN, an IP network address and credentials associated with a management console that receives an IP network address and credentials associated with the GMS;

requests a public key from the management console using the management console IP network address and credentials associated with the management console;
receives the requested public key from the management console;
transmits the IP network address and the public key of the management console to each server that is addressable over the LAN;
encrypts the inventory with the public key of the management console to generate an encrypted inventory; and
forwards the encrypted inventory to the management console to enable the management console to securely communicate with each server using asymmetric key cryptography.

9. The RAC of claim 8, wherein the GMS:
in response to monitoring the at least one network:
discovers an added server;
adds the link local IP network address for the added server to the inventory;
encrypts at least an updated portion of the inventory with the public key of the management console to generate an encrypted inventory update; and
sends the encrypted inventory update to the management console to enable communication between the management console and the added server using asymmetric key cryptography.

10. The RAC of claim 9, wherein:
the added server is ungrouped with the GMS; and
in response to monitoring the at least one network, the GMS receives a publication from the at least one server using multicast domain name system service discovery (mDNS-SD) protocol.

11. The RAC of claim 8, wherein the GMS, in response to receiving a request from a remote device for access to the GMS:
identifies a role assigned to the remote device by the management console; and
responds to the remote device according to role-based access control (RBAC) procedures based on the role assigned to the device.

12. The RAC of claim 8, wherein the GMS:
receives a domain token;
sends the domain token to each server accessible via the LAN to establish a domain group;
receives a communication request from a requesting management console;
in response to receiving the communication request, determines whether the communication request includes the domain token, indicating that the requesting management console is domain authorized;
in response to determining that the communication request includes the domain token, responds to the communication request; and
in response to determining that the communication request does not include the domain token, ignores the communication request.

13. A method for automating acquisition of link local Internet Protocol (IP) network address and credentials of servers, the method comprising:
maintaining, by a group manager server (GMS), an inventory of respective link local IP network address and public keys of each server known to the GMS that is addressable over the at least one network;
receiving, by the GMS via the at least one network, an IP network address and credentials associated with a management console that receives an IP network address and credentials associated with the GMS;
requesting, by the GMS, a public key from the management console using the management console IP network address and credentials associated with the management console;
receiving, by the GMS, the requested public key from the management console;
transmitting, by the GMS, the IP network address and the public key of the management console to each server that is addressable over the at least one network;
encrypting, by the GMS, the inventory with the public key of the management console to generate an encrypted inventory; and
forwarding, by the GMS, the encrypted inventory to the management console to enable the management console to securely communicate with each server using asymmetric key cryptography.

14. The method of claim 13, wherein:
the first network interface comprises a wide area network (WAN) interface coupled to a WAN for communication with an administrator system and the management console; and
the IP network address and the credentials associated with the management console are received from an administrator system via the WAN.

15. The method of claim 14, further comprising providing out-of-band communication, by a remote access controller (RAC) that has the functionality of the GMS, with the management console, administrative system and a respective RAC of the servers to transfer the public keys, IP network addresses, and encrypted inventory.

16. The method of claim 13, further comprising:
in response to monitoring the at least one network:
discovering an added server;
adding the link local IP network address for the added server to the inventory;
encrypting at least an updated portion of the inventory with the public key of the management console to generate an encrypted inventory update; and
sending the encrypted inventory update to the management console to enable communication between the management console and the added server using respective private keys.

17. The method of claim 16, wherein:
the added server is ungrouped with the GMS; and
the method further comprises, in response to monitoring the at least one network, receiving the publication from the at least one server using multicast domain name system service discovery (mDNS-SD) protocol.

18. The method of claim 13, further comprising, in response to receiving a request from a remote device for access to the GMS:
identifying a role assigned to the remote device by the management console; and
responding to the remote device according to role-based access control (RBAC) procedures based on the role assigned to the device.

19. The method of claim 13, further comprising:
receiving a domain token by the GMS;
sending the domain token to each server accessible via the LAN to establish a domain group;
receiving a communication request from a requesting management console;
in response to receiving the communication request, determining whether the communication request includes the domain token, indicating that the requesting management console is domain authorized;

in response to determining that the communication request includes the domain token, responding to the communication request; and in response to determining that the communication request does not include the domain token, ignoring the communication request.

* * * * *